United States Patent
Collier et al.

(10) Patent No.: US 9,435,713 B2
(45) Date of Patent: Sep. 6, 2016

(54) SYSTEM AND METHOD FOR IDENTIFYING FIBER SEQUENCE IN A MULTI-FIBER OPTICAL CABLE

(71) Applicant: AFL Telecommunications LLC, Duncan, SC (US)

(72) Inventors: Michelle Collier, Bedford, NH (US); Scott Prescott, Belmont, NH (US); Joe Fitzgerald, Concord, NH (US)

(73) Assignee: AFL Telecommunications LLC, Duncan, SC (US)

(*) Notice: Subject to any disclaimer, the term of this patent is extended or adjusted under 35 U.S.C. 154(b) by 0 days.

(21) Appl. No.: 14/397,910

(22) PCT Filed: May 29, 2013

(86) PCT No.: PCT/US2013/043008
§ 371 (c)(1),
(2) Date: Oct. 30, 2014

(87) PCT Pub. No.: WO2013/181197
PCT Pub. Date: Dec. 5, 2013

(65) Prior Publication Data
US 2015/0124246 A1    May 7, 2015

Related U.S. Application Data

(60) Provisional application No. 61/652,574, filed on May 29, 2012.

(51) Int. Cl.
*G01M 11/00* (2006.01)
*H04B 10/071* (2013.01)
*G02B 6/46* (2006.01)

(52) U.S. Cl.
CPC .......... *G01M 11/3136* (2013.01); *G02B 6/46* (2013.01); *H04B 10/071* (2013.01)

(58) Field of Classification Search
None
See application file for complete search history.

(56) References Cited

U.S. PATENT DOCUMENTS

| 6,028,661 A | 2/2000 | Minami et al. |
| 6,614,968 B1 * | 9/2003 | Eslambolchi ........ G02B 6/4469 385/100 |

(Continued)

FOREIGN PATENT DOCUMENTS

| EP | 0846943 A2 | 6/1998 |
| EP | 0908715 A2 | 4/1999 |
| EP | 0959337 A2 | 11/1999 |

OTHER PUBLICATIONS

International Search Report for PCT/US2013/043008 dated Oct. 31, 2013.

(Continued)

*Primary Examiner* — Gordon J Stock, Jr.
(74) *Attorney, Agent, or Firm* — Dority & Manning, P.A.

(57) ABSTRACT

A system, method and apparatus for identifying fiber sequence in a multi-fiber optical cable are disclosed. The system may include an OTDR device, a receiver, and a launch box. The receiver may comprise a plurality of receiver-fibers differentiated from each other by length. Each receiver-fiber is connected to a fiber of the cable. The launch-box enables the connection of the OTDR device to each of the fibers. A user may connect the output of the OTDR to each of the front ports of a front-connector and collects a trace for each front port. The traces may comprise a marker identifying, by length, the receiver-fiber connected to the fiber. A computer program may be used to compare the traces with each other and to determine a fiber sequence in the tested multi-fiber cable. The determined sequence may be displayed on the OTDR display.

18 Claims, 5 Drawing Sheets

(56) References Cited

U.S. PATENT DOCUMENTS

| | | | |
|---|---|---|---|
| 7,016,024 B2 | 3/2006 | Bridge et al. | |
| 7,808,621 B2 | 10/2010 | Russell | |
| 8,482,725 B2* | 7/2013 | Perron | G01M 11/3118 356/73.1 |
| 8,570,501 B2* | 10/2013 | Nagel | G01M 11/3136 356/73.1 |
| 8,711,341 B2* | 4/2014 | Blair | G01M 11/3136 356/73.1 |
| 8,996,778 B2* | 3/2015 | Alshinnawi | G06F 13/36 710/305 |
| 9,103,746 B2* | 8/2015 | Kaufhold | G01M 11/3136 |
| 2004/0015309 A1 | 1/2004 | Swisher et al. | |
| 2008/0297773 A1 | 12/2008 | Blair et al. | |

OTHER PUBLICATIONS

Written Opinion for PCT/US2013/043008 dated Oct. 31, 2013.
AFL Telecommunications LLC, European Patent Application No. 13797728.6; European Search Report; Jan. 7, 2016; (1 page).

* cited by examiner

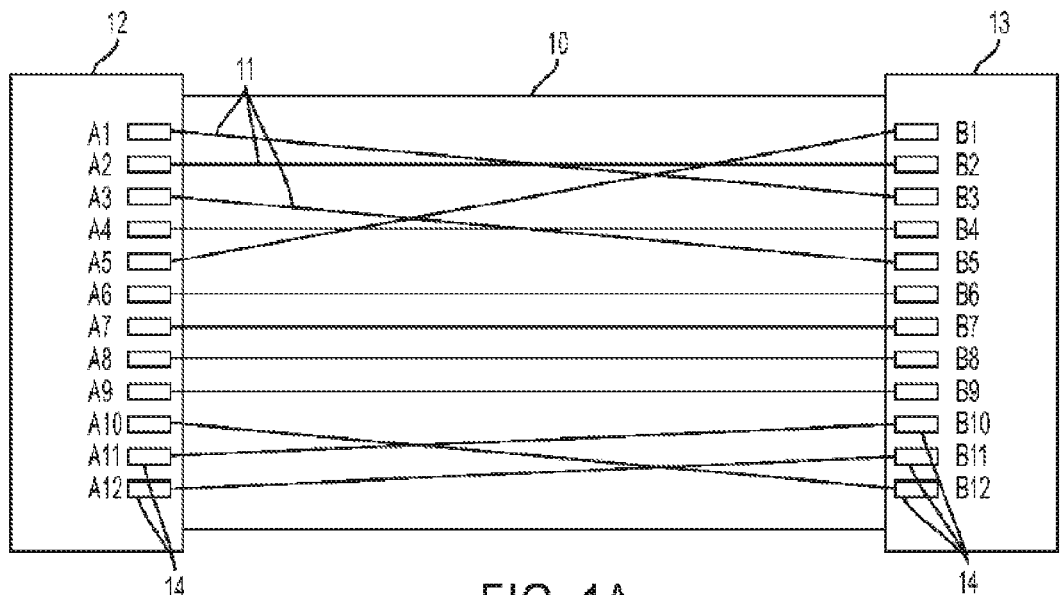
FIG. 1A
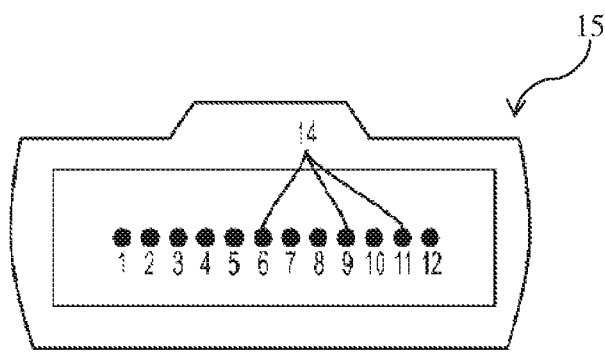
FIG. 1B
| | FIBER SEQUENCE (VIEWING THE END FACE OF THE CONNECTOR WITH KEY UP) | | | | | | | | | | | |
|---|---|---|---|---|---|---|---|---|---|---|---|---|
| FRONT PORTS | 1 | 2 | 3 | 4 | 5 | 6 | 7 | 8 | 9 | 10 | 11 | 12 |
| END PORTS | 3 | 2 | 5 | 4 | 1 | 6 | 7 | 8 | 9 | 12 | 10 | 11 |
FIG. 1C

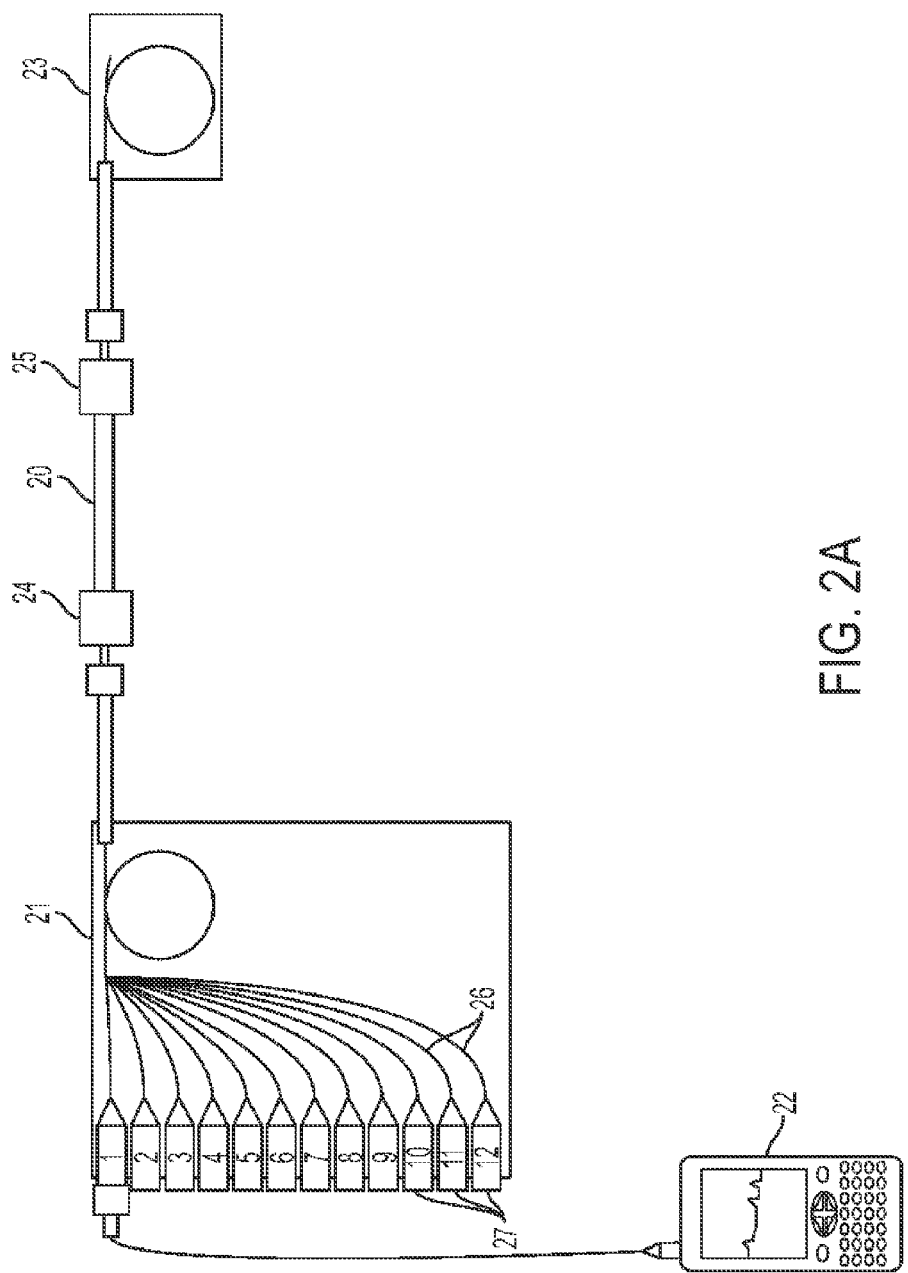

TYPE-A ARRAY

| | FIBER SEQUENCE (VIEWING THE END FACE OF THE CONNECTOR WITH KEY UP) | | | | | | | | | | | |
|---|---|---|---|---|---|---|---|---|---|---|---|---|
| FRONT PORTS | 1 | 2 | 3 | 4 | 5 | 6 | 7 | 8 | 9 | 10 | 11 | 12 |
| END PORTS | 1 | 2 | 3 | 4 | 5 | 6 | 7 | 8 | 9 | 10 | 11 | 12 |

TYPE-B ARRAY

| | FIBER SEQUENCE (VIEWING THE END FACE OF THE CONNECTOR WITH KEY UP) | | | | | | | | | | | |
|---|---|---|---|---|---|---|---|---|---|---|---|---|
| FRONT PORTS | 1 | 2 | 3 | 4 | 5 | 6 | 7 | 8 | 9 | 10 | 11 | 12 |
| END PORTS | 12 | 11 | 10 | 9 | 8 | 7 | 6 | 5 | 4 | 3 | 2 | 1 |

TYPE-C ARRAY

| | FIBER SEQUENCE (VIEWING THE END FACE OF THE CONNECTOR WITH KEY UP) | | | | | | | | | | | |
|---|---|---|---|---|---|---|---|---|---|---|---|---|
| FRONT PORTS | 1 | 2 | 3 | 4 | 5 | 6 | 7 | 8 | 9 | 10 | 11 | 12 |
| END PORTS | 2 | 1 | 4 | 3 | 6 | 5 | 8 | 7 | 10 | 9 | 12 | 11 |

SYSTEM AND METHOD FOR IDENTIFYING FIBER SEQUENCE IN A MULTI-FIBER OPTICAL CABLE

CROSS-REFERENCE TO RELATED APPLICATIONS

This application is based upon and claims the benefit of priority from U.S. Provisional Application No. 61/652,574, filed May 29, 2012, in the United States Patent and Trademark Office, the disclosures of which is incorporated herein in its entirety by reference.

BACKGROUND

1. Field

The invention is related to apparatuses, systems and methods for characterization of optical fibers included in multi-fiber array cables and patch-cords. More specifically, the invention relates to a system and method for finding fiber polarity, fiber sequencing, and the type of multi-fiber optical cables and patch-cords.

2. Related Art and Background

Optical fiber networks, such as Enterprise, and data centers are using multi-fiber array cables. A multi-fiber array cable may include a multitude of optical fibers arranged in various configurations. Installers of multi-fiber array cables and network owners have a need to characterize, test and trouble-shoot the cables and individual fibers. Examples of some of the tests used to characterize the fibers are: tests for finding the power loss along specific fibers in the cables, tests for finding the length of the various fibers in the cables, tests for finding the reflectance of fiber's ends, tests for finding the polarity of the fibers in the cables and tests for finding fiber sequencing in a multi-fiber array cable.

The Optical Time Domain Reflectometer (OTDR) is one of the most useful tools for characterization and testing of fiber optic cables. The OTDR can be used to measure the length of individual fibers in a cable, fiber attenuation, reflectivity of fiber ends, splice loss, connection losses. The OTDR can also be used to find fiber faults for each individual fiber in a cable. Patent Application Pub. No. US 2008/0297773 A1 describes using sets of OTDR receive-fibers with different lengths of marker events to verify optical fiber connectivity.

Users need a means of connecting to the array cable to make the required measurements and identify the fiber sequencing for each fiber in the cable. It is important to minimize multiple connections to the fiber to reduce contamination or damage due to repeated matings. Sometimes, multi-fiber cables are miss-mapped or mis-sequenced. That means that a certain cable has a different fiber sequence than the sequence it is supposed to have and the technician may not be aware of such mis-mapping or mis-sequencing. Using mis-mapped or mis-sequenced cables in a network may result in malfunction of the network.

Current solutions to the problems described above require a fan-out or cassette to be able to access individual fibers with optical test equipment. These solutions do not provide a means of identifying or verifying the fiber sequencing. Test personnel could test each fiber without knowing the mapping. These could result in problems during turn-up of the system if the fibers do not properly align with the rest of the system and equipment.

It is an object of the invention to provide an apparatus, a system and a method that enables a single OTDR technician to determine fiber polarity and fiber sequencing in a multi-fiber array cable. Consequently the technician will be able to determine the type of cable tested (e.g. type A, B, C, and others).

SUMMARY

Exemplary implementations of the present invention address at least the above problems and/or disadvantages and other disadvantages not described above. Also, the present invention is not required to overcome the disadvantages described above, and an exemplary implementation of the present invention may not overcome any of the problems listed above.

In one exemplary embodiment it is disclosed a method for identifying the sequence of fibers in a multi-fiber optical cable. The multi-fiber cable includes a plurality of fibers, each fiber being connected between a front-port of a plurality of front-ports and an end-port of a plurality of end-ports. An OTDR trace is collected for each front-port of the plurality of front-ports. The OTDR traces are compared with each other, via at least a processor, as associated with their corresponding front-port. For each front-port, it is determined the corresponding end-port of the fiber connected to the front-port. Thereby, the sequence of the multi-fiber cable is determined.

In other embodiments, a system for identifying fiber sequence in a multi-fiber optical cable is disclosed. The multi-fiber cable includes a plurality of fibers, each fiber being connected between a front-port of a plurality of front-ports and an end-port of a plurality of end-ports. The system includes an OTDR device and a non-transitory computer readable media including a program configured to compare with each other a plurality of OTDR traces. The multi-fiber optical cable is connected to a receiver comprising a plurality of receiver-fibers having lengths which are different from each other. Each fiber of the multi-fiber cable is connected to a corresponding receiver-fiber. Each of the traces corresponds to a fiber of the plurality of fibers. Based on the aforementioned comparison, the computer program further determines a sequence of the fibers in the multi-fiber cable.

In other embodiments a non-transitory computer readable media includes a program configured to compare with each other a plurality of OTDR traces corresponding to a plurality of fibers in a multi-fiber optical cable. Each of the traces corresponds to a fiber of the multi-fiber optical cable and the trace comprises an identifying marker of a receiver-fiber connected to the fiber. Based on the results of the aforementioned comparison, the program is further configured to determine the sequence of fibers in the multi-fiber cable.

BRIEF DESCRIPTION OF THE DRAWINGS

FIG. 1A is a diagram showing the connection of fibers in a multi-fiber optical cable according to an exemplary embodiment of the present invention.

FIG. 1B is a front view of an MTP/MPO optical fibers connector.

FIG. 1C shows the sequence of the multi-fiber optical cable of FIG. 1B.

FIG. 2A shows a system for finding the fibers sequence of a multi-fiber cable according to an exemplary embodiment of the present invention.

FIG. 2B shows the lengths of the receiver fibers according to an exemplary embodiment of the present invention.

DETAILED DESCRIPTION

Figure 3:
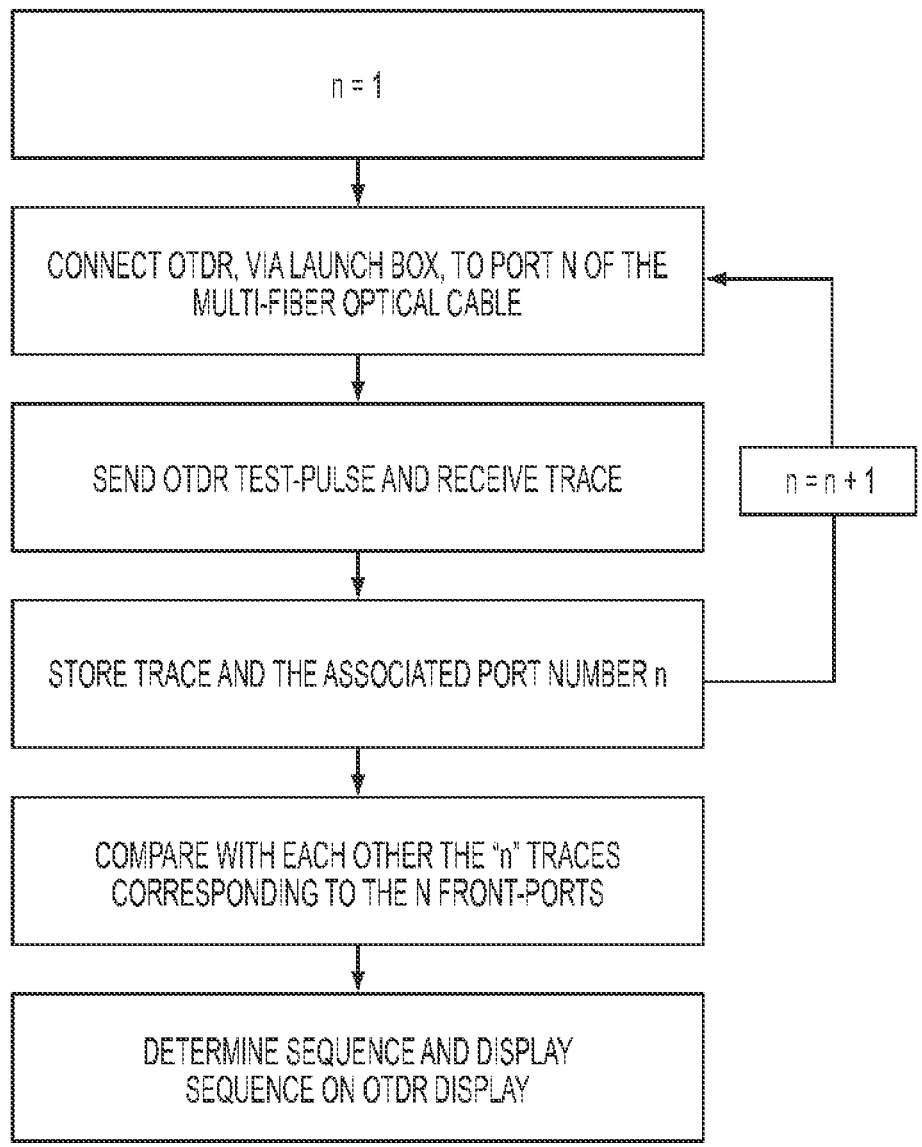
FIG. 3 shows a flowchart of a method for finding the sequence of a multi-fiber optical cable according to an exemplary embodiment of the present invention.

The following detailed description is provided to gain a comprehensive understanding of the methods, apparatuses and/or systems described herein. Various changes, modifications, and equivalents of the systems, apparatuses and/or methods described herein will suggest themselves to those of ordinary skill in the art. Descriptions of well-known functions and structures are omitted to enhance clarity and conciseness.

It will be understood that when an element is referred to as being "connected to" another element, it can be directly connected to the other element, or intervening elements may be present.

The terminology used herein is for the purpose of describing particular embodiments only and is not intended to be limiting of the present disclosure. Although some features may be described with respect to individual exemplary embodiments, aspects need not be limited thereto such that features from one or more exemplary embodiments may be combinable with other features from one or more exemplary embodiments.

Hereinafter, an exemplary embodiment will be described with reference to accompanying drawings.

Referring to the drawings, FIG. 1A shows a schematic diagram of a multi-fiber optical cable or a patch-cord. A multi-fiber optical cable includes a cable 10 including a plurality of n fibers 11, a first-connector 12 at one end of the cable, and a second-connector 13 at the other end of the cable. The first-connector and the second connector include a plurality of ports 14. FIG. 1B shows ports 1 to 12 on an MTP/MPO connector 15. The invention is not limited by the number of fibers, the number of ports of the connectors or by the configuration of the ports in the connectors. For example, the connectors may include any number of ports arranged in various configurations.

Each of the fibers comprises a first-end connected to a certain port on the first-connector and a second-end connected to a certain port on the second-connector. The ports on the first-connector are arranged in a certain sequence and may be associated a number. For the sake of clarity we identify each port on a connector, among the plurality of ports, by a port number. For instance, as seen in FIG. 1B on an MTP/MPO connector the ports are conventionally referred as ports 1 to 12. The ports on a connector may be identified by numbers (e.g. port 1, port 2 and so on) or other identifiers.

Referring to the drawings, FIG. 1A shows a schematic diagram of a multi-fiber optical cable. The diagram in FIG. 1A shows the ports of the first-connector (A1 to A12), the ports of the second-connector (B1 to B12) and the cable fibers 11 (C1 to C12) connected between ports on the first-connector and ports on the second-connector.

FIG. 1C shows a fiber connection diagram, the fibers sequence, or the mapping of the fibers in the multi-fiber cable in FIG. 1A. For instance, as seen in FIG. 1C, fiber C1 is connected between port A1 on the-first connector and port B3 of the second-connector, fiber C3 is connected between port A3 on the-first connector and port B5 of the second-connector and so on. Thus the mapping or sequence of a multi-fiber optical cable refers to a correspondence or a function that associates to each fiber in the cable its corresponding connection ports on the first-connector and the second-connector.

Referring to the drawings, FIG. 2A shows a system for finding fibers mapping or fibers sequence of a multi-fiber cable 20 comprising 12 fibers (C1 to C12), according to an exemplary embodiment of the invention. The system may include a launch-box 21, an OTDR 22, and a receiver-box 23. The multi-fiber cable 20 may include an MTP/MPO front-connector 24 at one end and an MTP/MPO end-connector 25 at the other end. The front-connector may include 12 ports F1 to F12, as the ones shown in FIG. 1B, while the end-connector may include 12 ports E1 to E12. The invention is not limited by the number of fibers in the cable or by the types of connectors used. For instance, the cable may include any number of fibers, various connector types and configurations, and various fiber sequences.

The launch-box 21 enables the connection of the OTDR to each of the front-ports F1 to F12 of the front-connector 24. The launch box may comprise a plurality of 12 single fibers 26 having one end connected to the front-ports F1 to F12 of the front-connector 24 and the other end to individual ports 27. The launch-box fibers may connect the front-ports F1 to F12 to the individual ports 27 in a predetermined way such that a user may connect the OTDR to the desired front-port. For instance front-port F1 of the connector 24 may be connected with connector-1 among the connectors 27, the second front-port F2 on the connector 24 may be connected with connector-2 of connectors 27 and so on. Thus, a user may connect the OTDR to each of the front-ports F1 to F12 and the corresponding fibers in the multi-fiber cable according to user's needs. The invention is not limited by the configuration of the launch-box. For instance, various configurations of the launch box or other means enabling the connection of the OTDR to each of the fibers in the cable may be implemented.

The receiver-box 23 may include a plurality of receiver-fibers R1 to R12. Each of the receiver-fibers may be connected to an end-port E1 to E12 of the end-connector 25 according to a predetermined scheme. For instance, receiver-fiber R1 may be connected to end-port E1, receiver-fiber R2 may be connected to end-port E2 and so on. Light pulses may travel from the OTDR to a fiber in the launch-box, further through a cable-fiber Cm, and further through the corresponding receiver-fiber Rn connected to the cable-fiber Cm. Thus an OTDR trace collected via these fibers may include characteristics of the cable-fiber Cm and the receiver-fiber Rn. The receiver fibers R1 to R12 may be differentiated from each other by their length. For instance, as shown in FIG. 2B, a first receiver-fiber R1 may have a length of 150 meters while the lengths of each of the subsequent receiver-fibers R2 to R12 may successively increase by 10 meters. The OTDR traces of the tested fibers include markers identifying the total length of the receiver-fibers connected to the cable fiber tested.

In an exemplary embodiment of the invention a user may connect the OTDR to a front-port of the multi-fiber optical cable (e.g. the Fm front-port) and may send an OTDR pulse.

A cable fiber Cm may be connected between the Fm front-port and an En end-port. Receiver-fiber Rn may be connected to the En end-port. An OTDR pulse may travel from OTDR to the front-port Fm, further through the cable fiber Cm to the end-port En, and further through receiver-fiber Rn to the end of the receiver fiber where it may be reflected. The user may collect an OTDR trace which includes information about the length of the receiver-fiber Rn, thereby identifying the receiver-fiber.

Referring to the drawings, FIG. 3 shows a diagram of a method for finding the sequence of a multi-fiber cable according to an exemplary embodiment of the invention. A user may sequentially connect the OTDR to each of the front-ports F1 to F12 and collect traces T1 to T12 corresponding to each of the front-ports F1 to F12. Each of the collected traces may be stored on a computer readable media as associated with the front-port number via which they are collected. Each of the traces T1 to T12 includes identifying information of the tested receiver-fiber. Thus, the specific receiver-fiber corresponding to each trace may be identified. Thereby, for each specific front-port (e.g. Fm), it is possible to identify the specific receiver-fiber (e.g. Rn) connected to the specific front-port via a cable-fiber and an end-port. Since each of the receiver fibers R1 to R12 are connected to the end-ports E1 to E12 in a predetermined known way (e.g. E1 to R1, E2 to R2 and so on), it is possible to determine for each front-port Fm the corresponding end-port En connected to the front port via a cable-fiber. Thus, by determining for each front-port Fm the corresponding end-port En, the sequence or the mapping of the fibers in the multi-fiber cable, as the sequence shown in FIG. 1C, is determined.

In an exemplary embodiment of the invention, a user may collect OTDR traces corresponding to each of the front-ports of a multi-fiber optical cable. The traces may be stored on a computer readable media and processed via one or more computer processors. For each OTDR trace an input may be received, automatically or from a user, specifying a port number of the front-connector via which the OTDR trace was received. The received port number may be stored as associated to the corresponding trace. A computer readable media may store the lengths of each of the receiver-fibers and the corresponding end-port number to which each of the receiver-fiber is connected.

A computer program may compare with each other, via one or more computer processors, the traces T1 to T12 corresponding to each front-port, considering the lengths and connection of the receiver-fibers, and determine for each front-port number Fm the corresponding end-port number En connected to the front-port by a cable-fiber. Thus, the program may determine the fiber sequence and the mapping of the tested multi-fiber optical cable.

The determined fiber sequence may be displayed on the OTDR display or on an external display in a manner similar to the sequence shown in FIG. 1C.

The invention is not limited by the number of receiver-fibers in the receiver-box or by the particular length of each fiber. For instance, a system with any number of receiver-fibers is within the scope of the invention. Further, a system in which the receiver-fibers have different lengths, are arranged in a different sequence, and are connected to the end-ports in a different sequence also comes within the scope of the invention.

Moreover, the invention is not limited to differentiating between receiver-fibers by their length. An artisan would understand that the receiver-fibers may be differentiated from each other in other ways by using other types of OTDR marker events. For instance, the marker events may include high or low optical loss events, high and low reflectivity OTDR events, and concatenated sections of fiber with high and low backscatter coefficients to create patterns of high and low backscatter.

Further, the invention is not limited by the type or location of the computer readable media, the processors and the programs. For instance, various types of computer readable media may be used, such as hard disks, volatile and non-volatile memory device. Further, the computer readable media and the program may be located on the OTDR or on external devices such as a laptop.

Multi-fiber optical cables or patch-cords may have different fiber sequencing and cables may be categorized by "type" based on their fiber sequencing. For instance, FIG. 4A shows the map or fiber sequence of a Type-A multi-fiber optical cable, a sequence of a Type-B multi-fiber optical cable and a sequence of a Type-C multi-fiber optical cable.

Figures 4A, 4B:
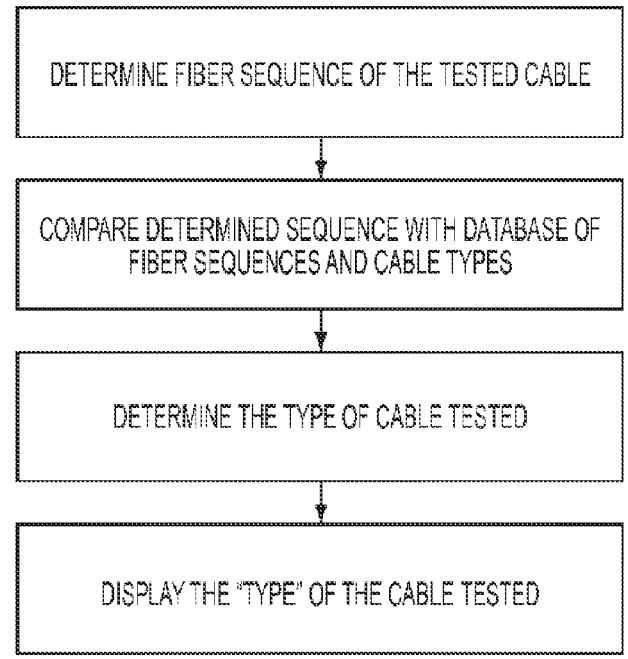
FIG. 4A shows the sequences of a Type-A cable, a Type-B cable, and a Type-C cable.
FIG. 4B shows a flowchart of a method for determining the "type" of a multi-fiber optical cable according to an exemplary embodiment of the present invention.

Referring to the drawings, FIG. 4B shows a diagram of a method for finding the "type" of a multi-fiber cable, according to an exemplary embodiment of the invention. A computer readable media may store in a database a plurality of pre-determined cable sequences corresponding to various types of multi-fiber optical cables. For instance, the computer readable media may store in a database the fiber sequence for the Type-A, for Type-B, for Type-C and for other types of multi-fiber optical cables. A multi-fiber cable MF1 may be tested by the procedures described above and a sequence of the cable MF1 may be determined. A computer program may compare the determined sequence of the cable MF1 with the pre-determined sequences corresponding to various types of cables in the database (e.g. Type-A, Type-B, Type-C, etc.). If a match is found between the sequence of the tested cable MF1 and the sequence of a specific cable in the database, a message may be displayed on the OTDR display specifying that the tested cable MF1 has the same "type" as the matching cable in the database (e.g. "the tested cable is Type-A"). If no match is found, then a message may be displayed specifying that the tested cable is not of a type in the database.

Figure 5:
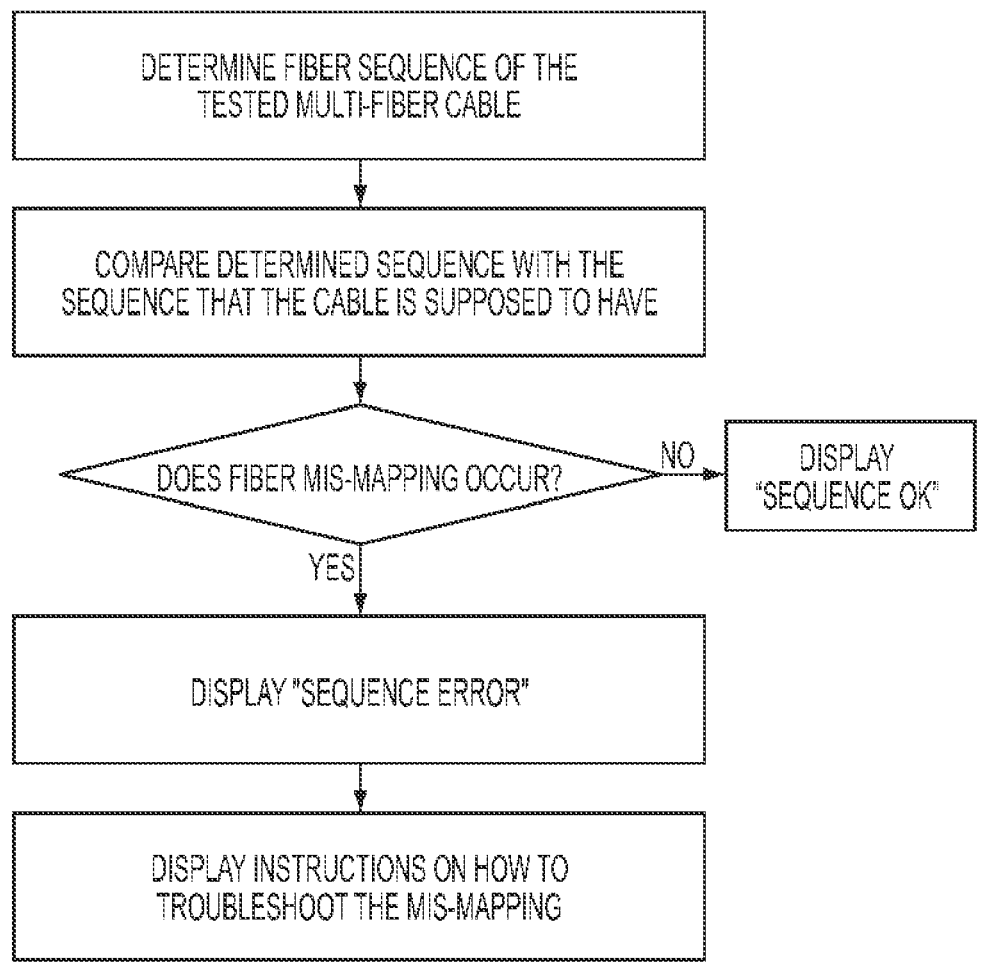
FIG. 5 shows a flowchart of a method for determining whether a multi-fiber optical cable is mis-sequenced, according to an exemplary embodiment of the present invention.

With regard to FIG. 5 of the drawings, in an exemplary embodiment of the invention a computer readable media may store a pre-determined cable sequence that a certain multi-fiber cable MF2 is supposed to have. The sequence of the cable MF2 is determined by the procedures described above. A computer program may compare the determined fiber sequence of the tested cable MF2 with the pre-determined sequence that the tested cable MF2 is supposed to have. If the sequence determined by testing the MF2 cable is identical with the pre-determined sequence the MF2 cable is supposed to have, then a message may be displayed on the OTDR display, as shown in FIG. 5, specifying that the tested cable MF2 is correctly mapped or has the correct expected sequence.

If the sequence determined by testing the MF2 cable is not identical with the pre-determined sequence of the MF2 cable, then a message may be displayed specifying that the cable is mis-mapped or mis-sequenced, as seen in FIG. 5. Further, a message may be displayed specifying the mis-mapped fibers and the corresponding ports to which each of the mis-mapped fibers are connected. Alternatively, a diagram may be displayed showing the mis-mapped fibers and the corresponding ports to which each of the mis-mapped fibers are connected.

Further, a computer program may be provided that determines and displays one or more procedures for troubleshooting or correcting the mis-mapping of the tested cable. For instance, such a procedure may specify that "the end of the fiber connected to end-port 5 should be moved to end-port 4 while the end of the fiber connected to end-port 4 should be moved to end-port 5" or that "the end of the fiber connected to front-port 1 should be moved to front-port 3 while the end of the fiber connected to front-port 3 should be moved to front-port 1."

The invention is not limited by the display where various messages are displayed. For instance, messages may be displayed on the OTDR display, on external displays connected to the OTDR such as a laptop display or on a remote network display.

In an exemplary embodiment of the invention, a controller and a computer program may be used to automatically connect the output of the OTDR to a specific front-port Fm of the front-connector 24 and collect a trace of the fiber corresponding to the front-port. Further, the controller and the computer program may automatically switch the output of the OTDR from one front port to the next and sequentially collect traces from each port of the front-connector. Each collected trace may be automatically stored as associated with the port number of the front-port via which the trace was collected (T1, F1).

The automatic switching of the optical connections to the OTDR may be performed by an optical switch. The optical switch may be controlled manually with buttons on the optical switch or by a separate computer or by the OTDR. The OTDR may control the optical switch by a separate electrical, optical or wireless connection to the optical switch. The OTDR may also be able to control the optical switch with optical pulses through the connected fiber between the optical switch and the OTDR's test port. Thus, it is not necessary that a user manually connects the OTDR output to individual ports (such as ports 27 in FIG. 2) and the user does not need to input the front-port number for each of the collected trace.

The invention provides users with a system, apparatus, and method for identifying fiber sequencing of multi-fiber optical cables or patch cords. The invention allows users to find out prior to installation of a cable whether the cable is of the proper sequencing and "type" for their network or whether the cable needs to be swapped with another. By identifying mis-sequencing of a tested cable users can determine why a cable may not be working for its intended purpose. Further, a user can find whether a mis-sequenced cable can be re-worked or whether the cable will need to be replaced. Moreover, the user may be provided, via a display, with a procedure for re-working and trouble-shooting the mis-sequenced tested cable.

As mentioned above, although the exemplary embodiments described above are various fiber optic testing devices, they are merely exemplary and the general inventive concept should not be limited thereto, and it could also apply to other types of fiber optic testing devices.

What is claimed:

1. A method for identifying the sequence of fibers in a multi-fiber optical cable, the multi-fiber optical cable comprising a plurality of fibers, each fiber being connected between a front-port of a plurality of front-ports and an end-port of a plurality of end-ports; the method comprising:
   for each front-port of the plurality of front-ports, collecting an OTDR trace;
   comparing with each other, via at least a processor, the OTDR traces as associated with their corresponding front-port;
   for each front-port, determining the corresponding end-port of the fiber connected to the corresponding front-port thereby determining the sequence of the multi-fiber optical cable.

2. The method of claim 1, further comprising: displaying the sequence of the multi-fiber optical cable.

3. The method of claim 1, wherein:
   the plurality of fibers are connected, via the end-ports, to a receiver;
   the receiver comprises a plurality of receiver-fibers having lengths which are different from each other or comprising OTDR markers identifying each receiver-fiber; and
   each fiber is connected, via an end-port, to a corresponding receiver-fiber.

4. The method of claim 3, wherein the collecting an OTDR trace comprises:
   connecting an output of an OTDR to a front-port;
   sending a test pulse from the OTDR through a fiber connected to the front-port connected to the output of the OTDR and further through a corresponding receiver-fiber; and
   receiving the trace.

5. The method of claim 1, further comprising:
   storing, via at least a processor, a plurality of pre-determined fiber sequences associated with a plurality of cable types;
   comparing the determined sequence with the pre-determined fiber sequences;
   determining the cable type of the multi-fiber optical cable.

6. The method of claim 1, further comprising:
   storing, via at least a processor, a pre-determined fiber sequence;
   comparing, via at least a processor, the determined sequence of the multi-fiber optical cable with the pre-determined fiber sequence;
   determining, via at least a processor, mis-mappings of the multi-fiber optical cable;
   displaying the mis-mappings of the multi-fiber optical cable.

7. The method of claim 6, further comprising:
   determining a plurality of procedures for correcting the mis-mappings of the cable; and
   displaying instructions of how to implement the procedures.

8. A system for identifying fiber sequence in a multi-fiber optical cable, the multi-fiber optical cable comprising a plurality of fibers, each fiber being connected between a front-port of a plurality of front-ports and an end-port of a plurality of end-ports; the system comprising:
   an OTDR device; and
   a non-transitory computer readable media comprising a program configured to compare with each other a plurality of OTDR traces, each of the traces corresponding to a fiber of the plurality of fibers, and to determine a sequence of the fibers in the multi-fiber optical cable;
   wherein the multi-fiber optical cable is connected to a receiver comprising a plurality of receiver-fibers having lengths which are different from each other; and
   wherein each fiber is connected to a corresponding receiver-fiber.

9. The system of claim 8, further comprising a program configured to display the sequence of the multi-fiber optical cable.

10. The system of claim 8, wherein the non-transitory computer readable media further comprises a program configured to:
- store, via at least a processor, a plurality of pre-determined fiber sequences associated with a plurality of cable types;
- compare the determined sequence with the pre-determined fiber sequences;
- determine the cable type of the multi-fiber optical cable.

11. The system of claim 8, wherein the non-transitory computer readable media further comprises a program configured to:
- store, via at least a processor, a pre-determined fiber sequences;
- compare, via at least a processor, the determined sequence of the multi-fiber optical cable with the pre-determined fiber sequences;
- determine, via at least a processor, mis-mappings of the multi-fiber optical cable;
- display the mis-mappings of the multi-fiber optical cable.

12. The system of claim 11, wherein the non-transitory computer readable media further comprises a program configured to:
- determine a plurality of procedures for fixing the mis-mappings of the cable; and
- display instructions of how to carry on the procedures for fixing the mis-mappings.

13. A non-transitory computer readable media comprising a program configured to execute a method for identifying the sequence of fibers in a multi-fiber optical cable comprising a plurality of fibers, the method comprising:
- comparing with each other a plurality of OTDR traces corresponding to the plurality of fibers in the multi-fiber optical cable;
- determining a sequence of the multi-fiber optical cable; and
- outputting the sequence of the multi-fiber optical cable;
- wherein each trace of the plurality of OTDR traces corresponds to a fiber of the plurality of fibers and comprises an identifying marker of a receiver-fiber connected to the fiber.

14. The non-transitory computer readable media of claim 13, further comprising a program configured to display the sequence of the multi-fiber optical cable.

15. The non-transitory computer readable media of claim 13, further comprising a program configured to:
- store, via at least a processor, a plurality of pre-determined fiber sequences associated with a plurality of cable types;
- compare the determined sequence with the pre-determined fiber sequences; and
- determine the cable type of the multi-fiber optical cable.

16. The non-transitory computer readable media of claim 13, further comprising a program configured to:
- store, via at least a processor, pre-determined fiber sequences;
- compare, via at least a processor, the determined sequence of the multi-fiber optical cable with the pre-determined fiber sequences;
- determine, via at least a processor, mis-mappings of the multi-fiber optical cable; and
- display the mis-mappings of the multi-fiber optical cable.

17. The non-transitory computer readable media of claim 16, further comprising a program configured to:
- determine a plurality of procedures for correcting the mis-mappings of the multi-fiber optical cable; and
- display instructions of how to implement the procedures.

18. The non-transitory computer readable media of claim 13, wherein the program is stored on an OTDR device.

* * * * *